(12) United States Patent
Sattelberg et al.

(10) Patent No.: US 10,557,562 B2
(45) Date of Patent: Feb. 11, 2020

(54) VALVE

(71) Applicant: GOODWIN PLC, Stoke-on-Trent, Staffordshire (GB)

(72) Inventors: Manfred Sattelberg, Erkelenz-Borschemich (DE); Matthew Stanley Goodwin, Stafford (GB); Timothy James Preston, Stoke-on-Trent (GB); Paul Michael Root, Wrinehill (GB)

(73) Assignee: GOODWIN PLC, Stoke-on-Trent, Staffordshire (GB)

( * ) Notice: Subject to any disclaimer, the term of this patent is extended or adjusted under 35 U.S.C. 154(b) by 0 days.

(21) Appl. No.: 15/764,771

(22) PCT Filed: Sep. 29, 2016

(86) PCT No.: PCT/GB2016/053038
§ 371 (c)(1),
(2) Date: Mar. 29, 2018

(87) PCT Pub. No.: WO2017/055856
PCT Pub. Date: Apr. 6, 2017

(65) Prior Publication Data
US 2018/0283575 A1 Oct. 4, 2018

(30) Foreign Application Priority Data

Oct. 1, 2015 (GB) .................................. 1517368.5

(51) Int. Cl.
*F16K 31/54* (2006.01)
*F16K 31/53* (2006.01)
(Continued)

(52) U.S. Cl.
CPC ............. *F16K 31/54* (2013.01); *F16H 19/04* (2013.01); *F16K 3/265* (2013.01); *F16K 31/53* (2013.01)

(58) Field of Classification Search
CPC ........ F16H 19/04; F16H 19/043; F16K 31/54; F16K 31/53
(Continued)

(56) References Cited

U.S. PATENT DOCUMENTS 3,447,388 A * 6/1969 Darnell ................... F16H 19/04
384/276
5,494,254 A 2/1996 Dominka
(Continued)

FOREIGN PATENT DOCUMENTS

CA 872106 A 6/1971
CN 1699107 A 11/2005
(Continued)

OTHER PUBLICATIONS

Search Report regarding United Kingdom Patent Application No. GB1517368.5, dated Feb. 17, 2016.
(Continued)

*Primary Examiner* — Kevin F Murphy
*Assistant Examiner* — Kelsey E Cary
(74) *Attorney, Agent, or Firm* — Harness, Dickey & Pierce, P.L.C.

(57) ABSTRACT

An actuatable axial piston valve comprising a gear system to transform linear movement from an actuator to linear movement of the valve piston wherein said gear system comprises racks (2,3) and at least one idler pinion (1).

16 Claims, 5 Drawing Sheets

(51) Int. Cl.
*F16H 19/04* (2006.01)
*F16K 3/26* (2006.01)

(58) Field of Classification Search
USPC ........................................................ 251/250
See application file for complete search history.

(56) References Cited

U.S. PATENT DOCUMENTS

| | | | | |
|---|---|---|---|---|
| 6,626,201 | B1* | 9/2003 | Kim | E03F 5/042 137/1 |
| 2006/0278286 | A1* | 12/2006 | Spakowski | F16K 1/443 137/628 |
| 2013/0200285 | A1 | 8/2013 | Gent et al. | |
| 2015/0308583 | A1* | 10/2015 | Suzuki | F16K 31/53 74/665 A |

FOREIGN PATENT DOCUMENTS

| | | |
|---|---|---|
| CN | 103003609 A | 3/2013 |
| CN | 103615585 A | 3/2014 |
| EP | 2385284 A1 | 11/2011 |
| GB | 191202577 A | 5/1912 |
| GB | 209558 A | 1/1924 |
| WO | WO-2015049525 A1 | 4/2015 |

OTHER PUBLICATIONS

International Search Report regarding International Application No. PCT/GB2016/053038, dated Dec. 19, 2016.
Written Opinion of the International Searching Authority regarding International Application No. PCT/GB2016/053038, dated Dec. 19, 2016.
International Preliminary Report on Patentability regarding International Application No. PCT/GB2016/053038, dated Jan. 12, 2018.

* cited by examiner

VALVE

CROSS-REFERENCE TO RELATED APPLICATIONS

This application is a 371 U.S. National Stage of International Application No. PCT/GB2016/053038, filed Sep. 29, 2016, which claims the benefit of Great Britain Patent Application No. 1517368.5, filed Oct. 1, 2015. The entire disclosures of the above applications are incorporated herein by reference.

The present invention relates to an actuatable axial piston valve and a gear mechanism for such a valve. The valve may to actuated to be open or closed to fluid flow through the valve. Preferably the valve is an actuatable control valve which allows variations between full flow and no flow in the pressure drop across the valve (i.e. variations in flow rate through the valve), for instance a substantially continuous variation in flow resistance between full flow resistance and minimum flow resistance.

Actuatable control valves which can be operated under all pressure conditions and all differential pressures with low operating forces are known, for example from the valve manufacturer Mokveld NV as described in the Mokveld NV patent application CA 872,106. Such valves comprise an outer housing which defines an inlet opening and an outlet opening as well as an inner housing which houses a restrictor for restricting fluid flow along a fluid flow path through the valve. The restrictor is actuatable by an actuation rod from outside of the valve. The actuatable rod is arranged for linear motion with respect to the valve housing in a radial direction. The actuatable restrictor comprises a piston moveable in an axial direction by operation of the actuator to open or close or restrict the fluid flow path.

In the Mokveld NV actuatable piston valves axial movement of the piston is performed by a 90 degree toothrack system, a sliding gear mechanism that transfers a valve actuator force into an axial piston motion. The piston is operated by means of a piston rod and piston stem. The 90 degree angle transmission consists of a pair of sliding tooth racks with matching teeth located on both piston rod and stem. Generally the flat tooth beds are isolated from the fluid passing through the valve being contained within a housing and sealed by double primary seals on the piston rod and guide.

The use of a sliding gear mechanism to transfer the valve actuator force into an axial piston motion requires lubrication of the rack teeth and even when lubrication is maintained there is a risk of the mechanism seizing due to galling of the two angled sliding rack teeth over an extended period of use. Failure to provide and maintain adequate lubrication or ingess of dirt through failed seals may result in the valve actuating system catastrophically failing by seizing and becoming inoperable to control or cut off the flow.

US 2013/0200285, U.S. Pat. No. 5,494,254, EP 2 385 284 and CN103615585 relate to valves which use various arrangements of racks and pinions, but none of these documents relate to converting a linear input movement (of an actuator) to a linear output movement (of a piston).

According to the present invention there is provided an actuatable axial piston valve comprising a gear system to transform linear movement from an actuator to linear movement of the valve piston wherein said gear system comprises racks and at least one idler pinion.

In a preferred embodiment the actuator is arranged to provide linear movement of a first rack in a radial direction, linear movement of said first rack is arranged to provide rotational movement of said at least one idler pinion and rotation of said at least one idler pinion is arranged to provide axial movement of a second rack operably connected to said piston thereby providing linear movement of said piston in an axial direction with respect to the valve body. Generally the valve will be mounted in use for horizontal flow so that linear movement of the first rack in a radial direction with respect to the valve body is vertical movement and linear movement of the second rack in an axial direction with respect to the valve body is horizontal movement.

The gear system of racks and idler pinions avoids the problems arising from sliding racks. Even without lubrication the gear mechanism would at worst fail by gradual wear on the gear teeth resulting in backlash in the gear system but nonetheless leaving the gear system and so the valve fully operational to carry out flow control and isolation or shut off. In demanding environments such as the oil and gas or nuclear industries where it may be essential to be able to control flow and isolate or shut off the flow in a pipeline an axial piston valve comprising such an improved gear system will provide significant benefits. Moreover, the lower friction of the interaction between the racks and idler pinion compared to that between sliding racks allows for less powerful and so smaller and more economic valve actuators to be employed.

The present invention will now be described by way of example only with reference to the following drawings.

A first embodiment of the present invention will now be described with reference to FIGS. 1 and 2.

Figure 1:
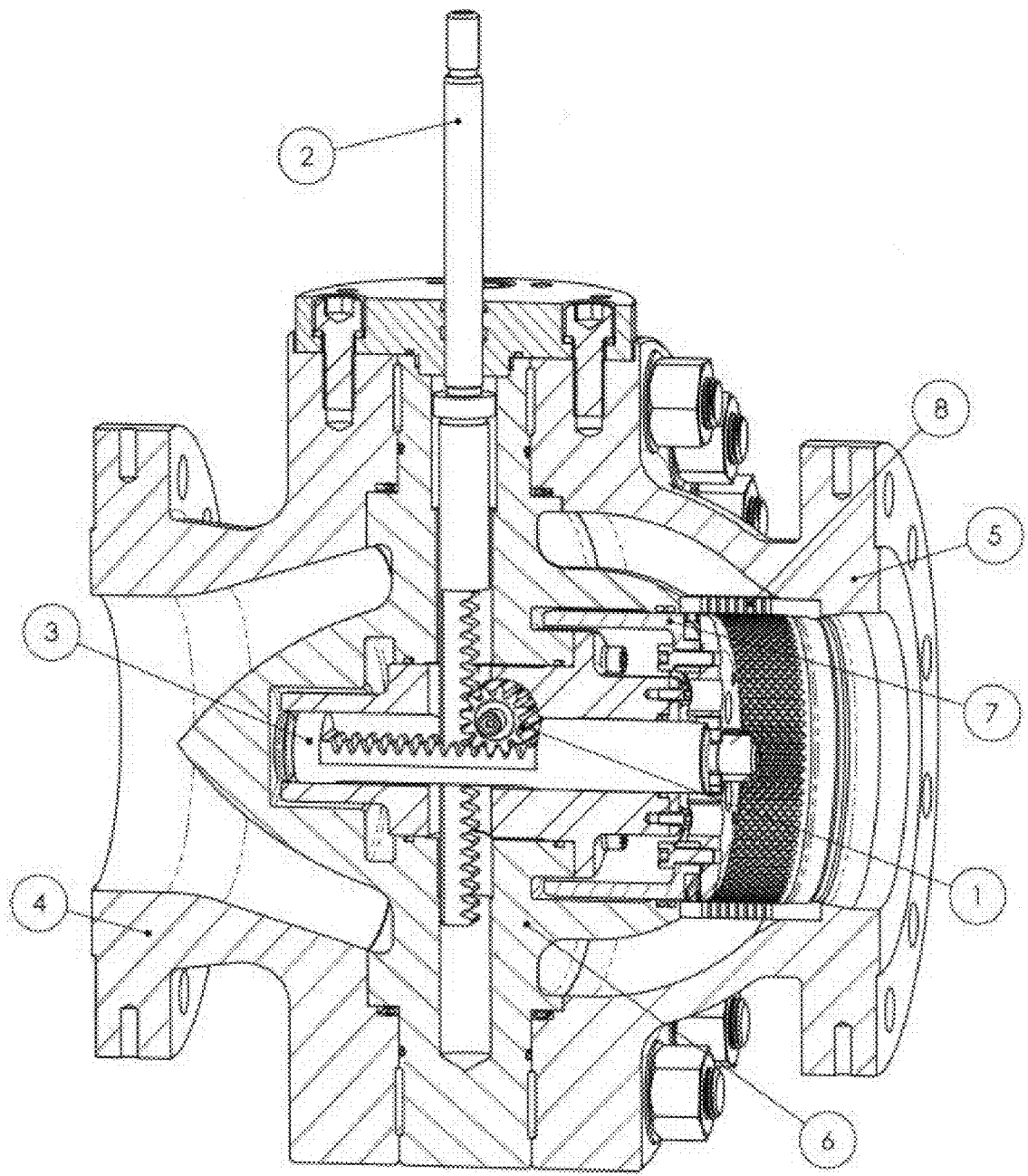
FIG. 1 is a cut away cross-sectional view of a valve with gear mechanism according to a first embodiment.

FIG. 1 illustrates an axial control valve fitted with an actuating mechanism (1,2,3) according to the invention. The valve as illustrated comprises a three part body, inlet end section (4), central section (6) and outlet section (5) as more generally described in the applicant's application published as WO 2015/049525 the contents whereof are incorporated by reference in their entirety. While the embodiment is illustrated in a three part valve the mechanism of the present invention could equally be applied to the single part Mokveld type valve or the applicant's two part valve design also described in WO 2015/049525. In the embodiment shown in FIG. 1 a piston 7 operates within a flow cage 8 to provide a flow control or choke valve. It will be understood that the flow cage can be omitted to provide an on/off valve.

The valve 1 operates in substantially the same way as the valves disclosed in WO 2015/049525 and is designed such that both the leading and trailing surfaces (surfaces not parallel to the axial direction) of moving components of an actuatable restrictor (3,7) for restricting fluid flow along a fluid flow path through the valve are in fluid communication with liquid on the upstream side. Thus, the pressures on either side of the moving components are equal and low actuation forces are needed to actuate the restrictor. The valves may be for use in the oil or chemical industries, for example.

The restrictor (3,7) comprises two main moveable components, namely a piston (7) and a piston rod (3). The piston (7) is moveable from a valve open position where it does not engage (e.g. touch) with the valve housing outlet section (5) to a valve closed position where it does engage with the valve housing outlet section (5). The piston (7) engages with a portion of the inner surface of the valve housing outlet section (5) blocks off the fluid flow path and thereby closes the valve.

The actuatable restrictor (3,7) also comprises the piston rod (3). The piston rod (3) has attached at one of its ends the piston (7).

Figure 2:
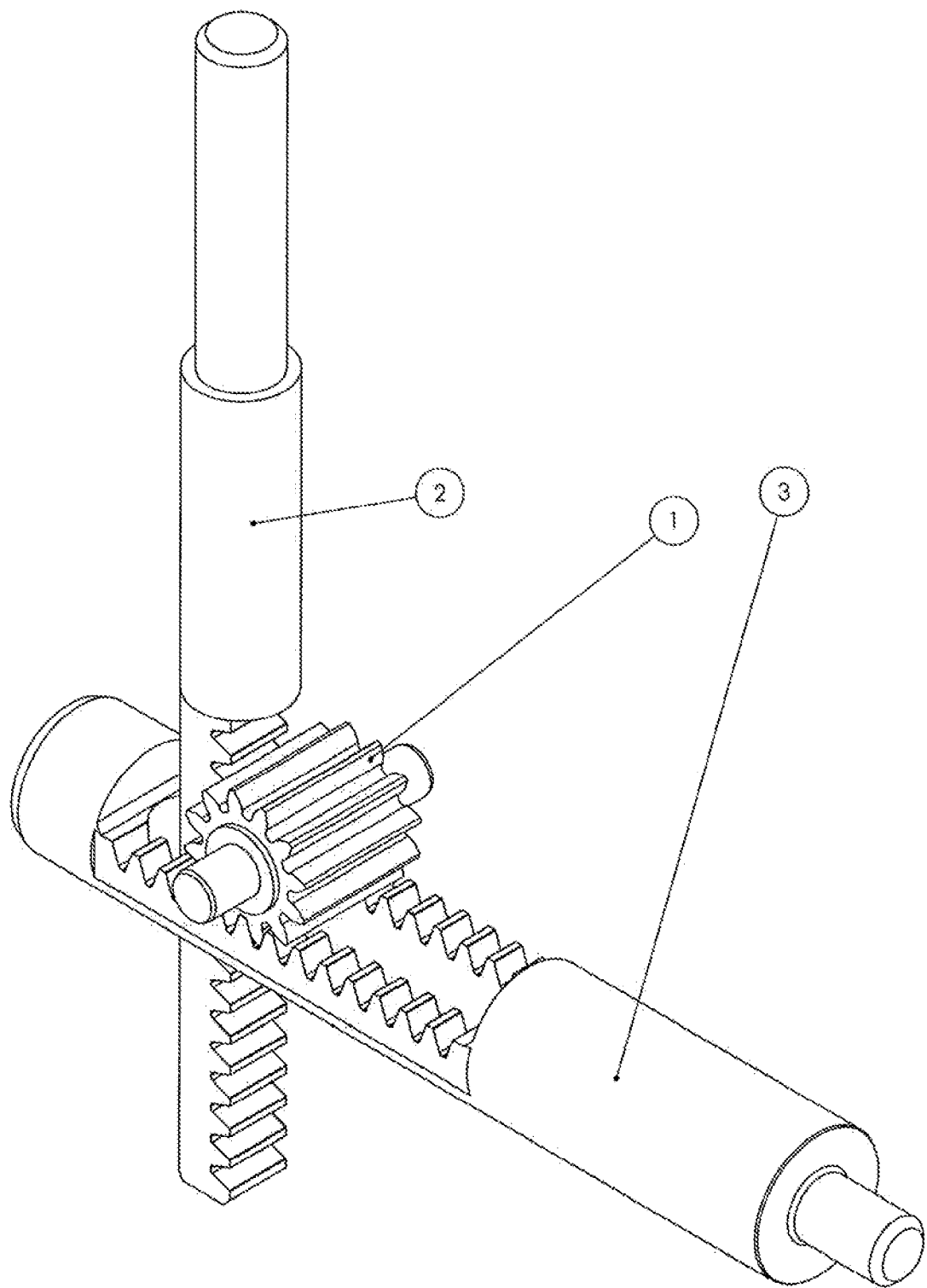
FIG. 2 is a perspective view of the gear mechanism of the assembled valve of FIG. 1.

The actuating gear mechanism (1, 2, 3) of FIG. 1 is shown in further detail in FIG. 2. The mechanism comprises an idler gear (1) rotatable by linear movement in a generally radial direction with respect to the valve (generally movement in a vertical direction in the normal case where the valve is mounted with a horizontal flow) of a toothed rack forming a part of the valve actuator shaft (2) with the rotation of the idler (1) interacting with a toothed rack forming part of the piston rod (3) causing axial (horizontal) movement of the piston rod (3) and attached piston (7). As illustrated in FIG. 2 the toothed rack section of the piston rod (3) may be formed with a slot through which the thinner toothed rack section of the valve actuator shaft (3) may be arranged to pass. The reverse arrangement where the actuator rod toothed rack section is wider than the piston rod toothed rack section and the slot is arranged in the toothed rack section of the actuator rod toothed rack section is also contemplated. The former arrangement as shown in FIG. 2 is preferred. In an alternative embodiment (not shown) the first and second rack may be arranged with clearance between their longitudinal edges. Generally the toothed rack section of the valve actuator shaft or the valve actuator shaft as a whole will be offset with respect to the radial centre of the valve and the toothed rack of the piston rod will be orientated in a centrally axial direction with respect to the valve. Clearance between the longitudinal edges of the two racks allows for movement of both racks at right angles to each other. The clearance should be sufficient to provide for this relative movement between the two racks under control of an idler pinion arranged to engage the two racks and may typically be in the range of between 0.05 mm and 50 mm.

Although it is preferred to machine the vertical rack of the actuator rod to be perpendicular to the piston axis it will be appreciated that the combination of two racks and idler pinion allows for variation of the angle between the racks without affecting the ability of longitudinal movement of the first rack (2) causing longitudinal movement of the second rack (3). The present invention accordingly includes valves where the racks (2, 3) are at a relative angle which is less than or greater than 90 degrees and in particular valves in which the toothed rack of the valve actuator shaft is not oriented precisely radially with respect to the valve (i.e. it is not precisely vertical in a valve mounted for horizontal flow).

As the racks and pinion have a rolling action there is much lower friction than the sliding motion of the sliding rack system. This places lower demands on the materials that could be used to manufacture the racks (2, 3) and reduces the risk of damage where the same rack material is used in the two systems. Typically the material for the racks (2, 3) and pinion (1) will be determined by the environment in which they are to be used and the load that they have to take. Examples of suitable material include Inconel 718 and Nitronic 60 for the racks (2,3) and 30CrNiMo8V for the pinion (1). The gear components may be hardened and/or coated to improve durability and reduce friction and wear.

The idler pinion gear (1) can be mounted either in a gear box module that is then fitted into the centre part of the valve body (6) or mounted directly into the centre part of the valve body (6). The use of the idler gear (1) which has a rolling and not a sliding action provides significantly lower friction even under high load than the sliding gear mechanism of the prior art Mokveld valve. This allows for smaller sized valve actuators to provide the axial movement of the actuator shaft (2). Suitable valve actuators may include electric, pneumatic, hydraulic or spring operated actuators.

As illustrated in FIG. 2, the toothed rack sections of the actuator rod (2) and the piston rod (3) and the toothed idler gear (1) may all be plain gear teeth. Alternatively the gear teeth may be chevron gear teeth or helical gear teeth or other teeth arrangements or combinations of the same. Chevron gear teeth provide the advantage of keeping the idler gear (1) self-centred on the axis of the actuator shaft (2). The gear teeth may be formed, machined or ground to increase precision and reduce the likelihood of wear and backlash.

A second embodiment will now be described. The second embodiment is the same as the first embodiment except as described below. Features of one embodiment may be used in the other embodiment and vice versa. The apparatus of the second embodiment works in the same way as that of the first embodiment and is merely an alternative layout which may be chosen if appropriate.

Figure 3:
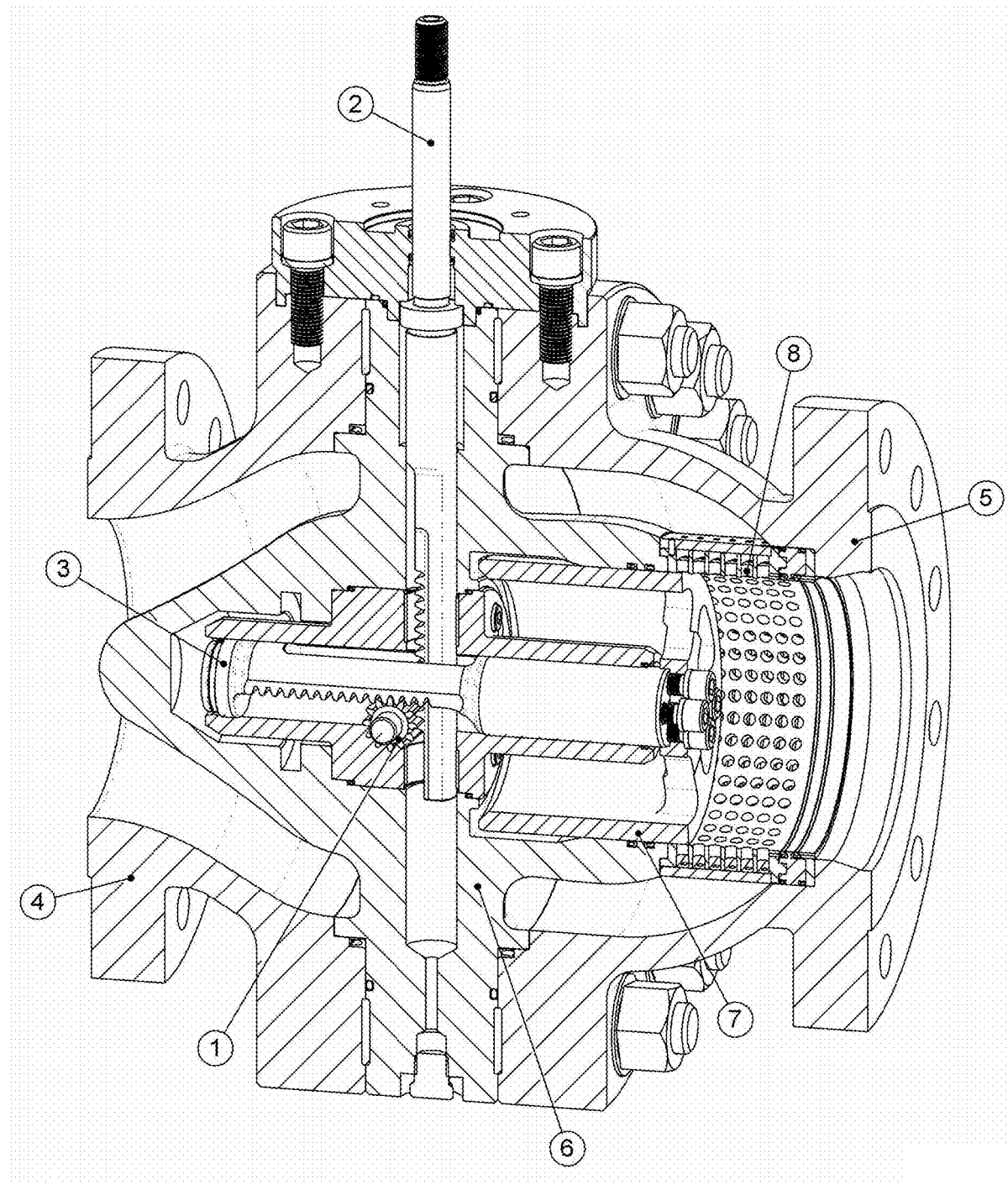
FIG. 3 is a cut away cross-sectional view of a valve with gear mechanism according to a second embodiment.
Figure 4:
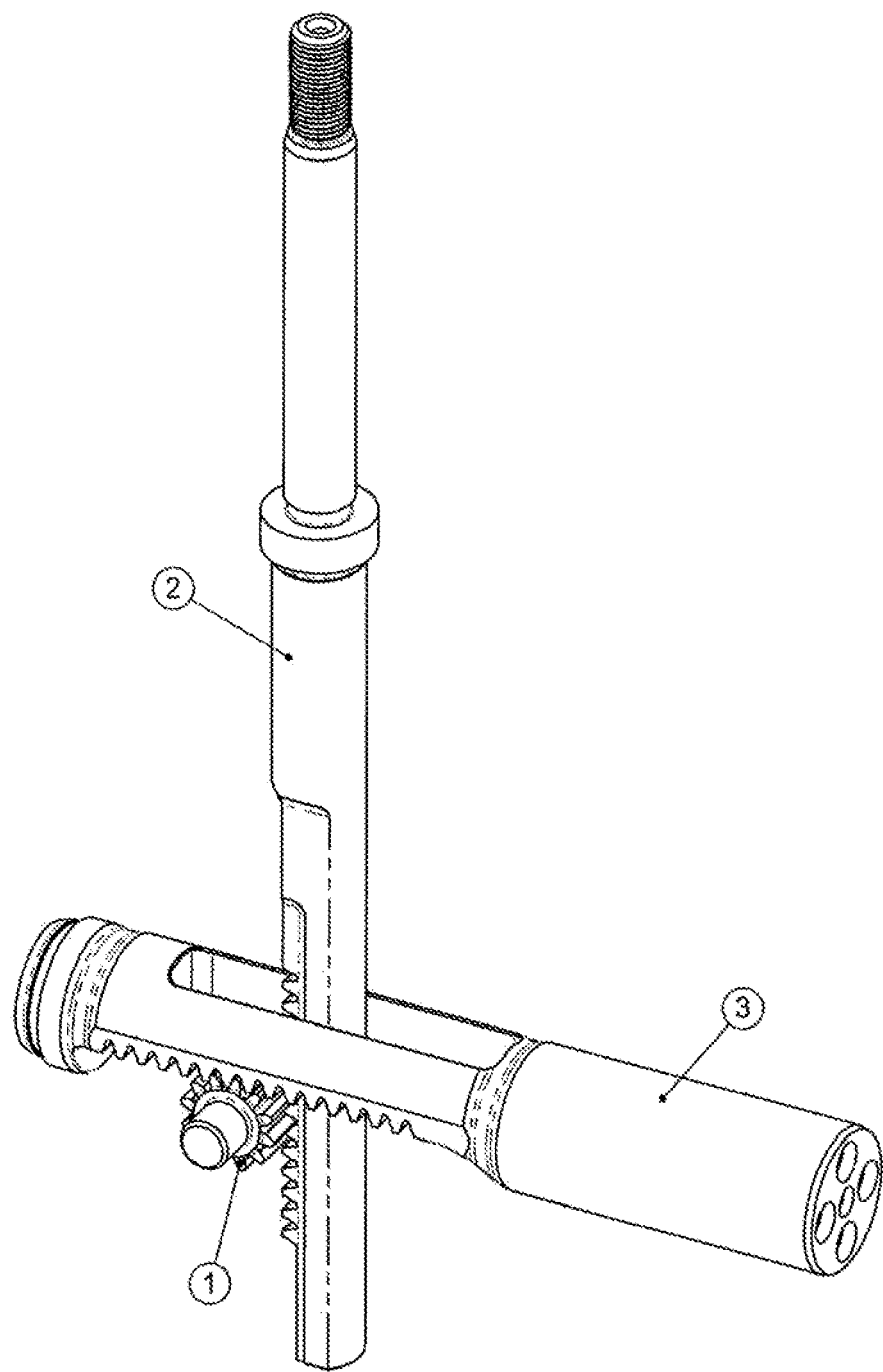
FIG. 4 is a perspective view of the gear mechanism of the assembled valve of FIG. 3.
Figure 5:
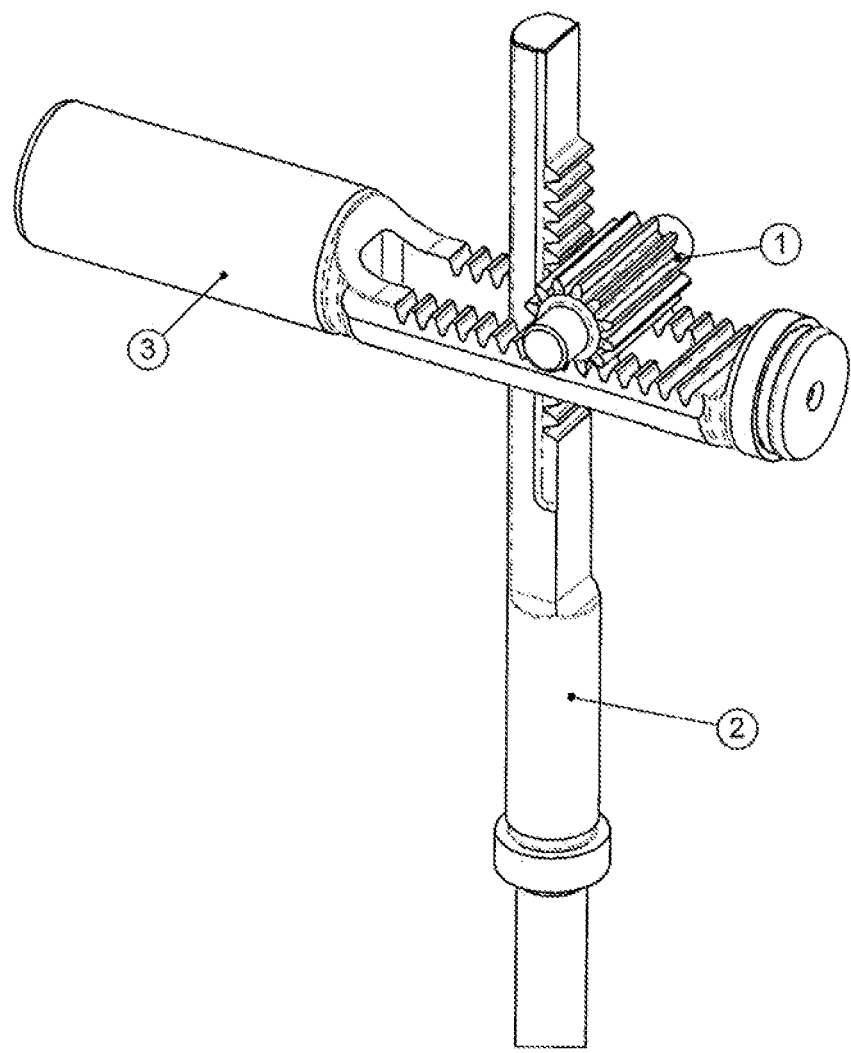
FIG. 5 is an alternative perspective view of the gear mechanism of the assembled valve of FIG. 3.

In the embodiment of FIGS. 3-5, the actuator rod (2), the piston rod (3) and the toothed idler gear (1) are arranged such that the idler gear (1) is located on the opposite side of the piston rod (3) to the top of the actuator rod (2), as opposed to in the first embodiment where the idler gear is located between the actuator rod (2) and the idler gear (1). That is, in the second embodiment, the actuator rod (2) is positioned closer to the valve piston (7) than the idler gear (1), and the teeth of the actuator rod (2) face away from the piston (7).

In other words, in the second embodiment, the piston rod (3) is rotated by 180 degrees about its longitudinal axis compared to in the first embodiment and the toothed idler gear (1) is moved accordingly.

Advantageously the gear system arrangement can be used with the two or three part axial piston valves described in WO 2015/049525 of the present applicant full details of which are incorporated by reference herein as well as the more conventional single part Mokveld type valves. Thus the present invention also includes an actuatable valve comprising:

an outer housing;
an upstream element of the outer housing defining an inlet opening;
a downstream element of the outer housing defining an outlet opening; and
an inner housing element inside the outer housing for housing an actuatable restrictor for restricting fluid flow along a fluid flow path through the valve;
wherein the inner housing element is non-integral with at least one or, as illustrated in FIG. 1, with both of the upstream and downstream elements
wherein the actuatable restrictor comprises a piston
and where said valve further comprises a gear system to transform linear movement from an actuator to linear movement of the valve piston wherein said gear system comprises racks and at least one idler pinion.

Valve body sections, particularly where the valve is of two or three part form as described in WO 2015/049525, may be made of castings, forgings, sintered powder metal, may be machined from solid or may be made using a combination of any one or more of these processes. Suitable materials will depend upon the valve application.

Axial piston valves according to the present invention have application in pipelines, particularly in the oil and gas and nuclear industries.

The invention claimed is:

1. An actuatable axial piston valve comprising: a piston rod, a valve piston and a gear system to transform linear movement from an actuator to linear movement of the valve piston, wherein:
    said gear system comprises racks and at least one idler pinion;
    the actuator is arranged to provide longitudinal movement of a first rack in a generally radial direction with respect to the valve;
    linear movement of said first rack is arranged to provide rotational movement of said at least one idler pinion;
    rotation of said at least one idler pinion is arranged to provide longitudinal movement of a second rack operably connected to said piston thereby providing movement of said piston in an axial direction with respect to the valve;
    the second rack forms part of the piston rod; and
    the valve piston is attached to one end of the piston rod.

2. The valve according to claim 1, wherein said first rack and said second rack are arranged at right angles to each other;
    wherein one of said first and second rack comprises a central slot through which the other of the first and second rack passes such that said first rack and said second rack are moveable at right angles with respect to each other.

3. The valve according to claim 1, wherein said racks and said at least one pinion comprise teeth selected from plain teeth, chevron teeth and helical teeth.

4. An actuatable valve according to claim 1 comprising:
    an outer housing;
    an upstream element of the outer housing defining an inlet opening;
    a downstream element of the outer housing defining an outlet opening; and
    an inner housing element inside the outer housing for housing an actuatable restrictor for restricting fluid flow along a fluid flow path through the valve, said actuatable restrictor comprising said piston;
    wherein the inner housing element is non-integral with at least one of the upstream and downstream elements.

5. The actuatable valve according to claim 4 wherein the inner housing element is non-integral with the upstream and downstream elements.

6. The actuatable valve according to claim 1 comprising one or more valve body sections shaped by casting, forging, sintering of powder metal, machining from solid or any combination thereof.

7. The valve according to claim 1 which is a flow control valve, a throttle valve, a choke valve or a shut off valve.

8. A pipeline comprising one or more valves according to claim 1.

9. The valve according to claim 1, wherein the valve is constructed and arranged to be operated by the gear system under all pressure conditions and all differential pressures.

10. The valve according to claim 1, wherein pressures on axial leading and axial trailing surfaces of the piston rod and valve piston are equal.

11. The valve according to claim 1, wherein the first rack is disposed between the valve piston and said at least one idler pinion.

12. The valve according to claim 1, wherein the second rack is positioned between axial ends of the piston rod.

13. The valve according to claim 1, wherein teeth of the first rack face away from the valve piston.

14. The valve according to claim 1, wherein the second rack comprises teeth that extend toward an outer surface of the piston rod.

15. The valve according to claim 1, wherein said first rack and said second rack are arranged at right angles to each other;
    wherein said first rack is offset from the radial line of the valve;
    wherein said first rack interfaces with said at least one idler pinion which transmits forces to said second rack;
    wherein said second rack and the piston to which it connects are located on the centre axial line of the valve;
    said first and said second rack running adjacent to each other with clearance between their longitudinal edges such that said first rack and said second rack are moveable at right angles with respect to each other.

16. The valve according to claim 15, wherein the second rack is the rack which comprises a central slot.

* * * * *